United States Patent Office 3,374,160

Patented Mar. 19, 1968

3,374,160

PHOTOPOLYMERIZATION WITH O-BROMO-ACETOPHENONE AS A PHOTOINITIATOR

Tzu Jen Mao, Royal Oak, Mich., assignor to General Motors Corporation, Detroit, Mich., a corporation of Delaware No Drawing. Filed Oct. 26, 1966, Ser. No. 589,486
5 Claims. (Cl. 204—159.23)

ABSTRACT OF THE DISCLOSURE

Ethylenically unsaturated organic monomers such as methyl methacrylate containing a small but effective amount of ortho-bromoacetophenone are polymerized upon exposure to ultraviolet light. Ortho-bromoacetophenone acts as a photopolymerization initiator.

This invention relates to the use of an initiator in the photopolymerization of monomers, and more particularly to the use of ortho-bromoacetophenone as the initiator in the photochemical polymerization of polymerizable ethylenically unsaturated organic monomeric compounds.

It is known that polymerizable ethylenically unsaturated organic monomeric compounds may be polymerized by the action of ultraviolet light. In such polymerization reactions, the rate of polymerization and also the length of the polymer chain produced are dependent on the nature and concentration of the monomeric material, the nature and concentration of an initiator, and also on the intensity and wavelength of the light.

It is the primary object of this invention to provide a novel initiator for the photopolymerization of polymerizable ethylenically unsaturated organic monomeric compounds. It is a further object to provide a process for the production of polymeric material by the photopolymerization of polymerizable ethylenically unsaturated organic monomeric compounds in which the rate of polymerization is markedly increased for a given light intensity of the appropriate wavelength. These and other objects are accomplished by incorporating small but effective amounts of ortho-bromoacetophenone in a monomer containing a polymerizable ethylenically unsaturated linkage and subjecting the solution to ultraviolet radiation until the polymerization has been effected.

Further objects and advantages of the present invention will be apparent from the following detailed description, reference being had to the following examples wherein preferred embodiments of the present invention are clearly shown.

In general, the process of the invention may be carried out as follows. A suitable amount of the ortho-bromoacetophenone is dissolved in an acrylic monomer and stirred until a homogeneous solution is obtained. Ortho-bromoacetophenone has the following structure:

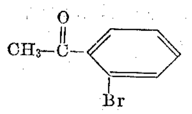

If the acrylic monomer used has a sufficiently low vapor pressure, the solution may be placed in an open reaction receptacle under atmospheric pressure; however, if the acrylic monomer has a high vapor pressure, it may be necessary to place the solution in a closed vessel under a suitable superimposed pressure in order to prevent excessive loss of the monomer due to volatilization. If a volatile acrylic monomer under superimposed pressure is to be polymerized, the reaction vessel should be constructed of a material which permits the maximum amount of ultraviolet radiation to pass through the reaction vessel. The reaction vessel should not be constructed of soft glass since soft glass will not transmit wavelengths below 3,500 Angstroms. Pyrex glass will not transmit below about 3,000 Angstroms. Vycor test tubes are constructed of a material which will permit lower wavelengths radiation to pass through; these test tubes are frequently used in the laboratory for photochemical polymerization. The reactions of this invention which a volatile acrylic monomer was used were carried out in Vycor test tubes which were fitted with a stopcock or a loose fitting cork. The purpose of the stopcock or cork is to prevent excessive volatilization and at the same time not to allow excessive pressures to be built up in the system. In addition, the stopcock was used primarily when it was desired to carry out the reaction in an oxygen-free atmosphere, such as nitrogen. To perform the reaction in a nitrogen atmosphere, it was first necessary to evacuate the system to a low pressure and then to flush it with a nitrogen atmosphere. This procedure is repeated three or four times to insure that all traces of air and/or oxygen have been removed. The initiator-containing acrylic solution is then subjected to ultraviolet light by means of an ultraviolet lamp (Hanovia) with a high pressure, mercury vapor arc tube providing radiation with wavelengths ranging from 1,849 Angstroms to 4,000 Angstroms positioned a distance of one to two inches away from the solution for periods of time ranging from 10 minutes to 30 minutes. As will hereinafter appear, clear, tough, solid polymers are obtained when the novel initiator described in this invention was used as the initiator in the photopolymerization of polymerizable vinyl type compounds.

*Example 1*

| | Ml. |
|---|---|
| Ortho-bromoacetophenone | 0.02 |
| Methyl methacrylate | 10 |

The solution of these two components was prepared and placed in a Vycor test tube which was fitted with a stopcock. It was degassed and flushed three times until the solution was blanketed under an atmosphere of nitrogen. It was then irradiated under a nitrogen atmosphere with ultraviolet light for 30 minutes. A polymer was precipitated from the solution with n-heptane and dried. The yield of the polymer in this reaction was 22.8%. A control sample, that is, methyl methacrylate which did not contain any initiator, yielded 2.4% polymer when exposed to the same conditions.

*Example 2*

A 10 milliliter methyl methacrylate solution containing 0.01 milliliter of ortho-bromoacetophenone was subjected to the same procedure as described in Example 1. The yield in this reaction was 16.3%.

*Examples 3, 4, 5, and 6*

Ortho-bromoacetophenone was used as a photo-initiator with the monomers styrene, methyl acrylate, glycidyl methacrylate and vinyl acetate in Examples 3, 4, 5 and 6 respectively. The polymerization of the monomer solutions was carried out in a Vycor test tube which was loosely corked to prevent undue loss from the vaporization of monomers. These monomeric solutions were irradiated under an air atmosphere with ultraviolet light for a time period ranging from 10 to 30 minutes. The following table lists the monomer, the initiator concentration, the reaction time and the yield.

| Ex. No. | Monomer, 10 ml. | Initiator Con., vol. percent | Reaction Time, minutes | Yield,[a] grams |
|---|---|---|---|---|
| 3 | Styrene | 0.1 | 30 | 0.212 |
| 4 | Methyl acrylate | 0.5 | 10 | >4.4 |
| 5 | Glycidyl methacrylate | 0.5 | 15 | 9.1 |
| 6 | Vinyl acetate | 0.5 | 15 | 3.93 |

[a] The control sample (no initiator) in each example did not yield any polymer except in Example No. 3 where the yield was 0.070 gram.

As is indicated by the above examples, ortho-bromoacetophenone is an effective initiator in the photopolymerization of a broad range of polymerizable ethylenically unsaturated organic monomeric compounds. This process is particularly useful when applied to the production of polymeric material from the polymerizable ethylenically unsaturated compounds which possess one or more unsaturated groups having the following structural formula in their molecules:

$$CH_2{=}C<$$

Examples of such compounds are methyl methacrylate, methyl acrylate, vinyl acetate, styrene, and glycidyl methacrylate, as indicated by the above examples, as well as acrylonitrile, 1,3-butadiene, ethyl crotonate, n-butyl acrylate, n-butyl methacrylate, chlorotrifluoroethylene, ethyl acrylate, ethyl methacrylate, 2-ethylhexyl acrylate, glycidyl acrylate, 2-methoxyethyl methacrylate, α-methylstyrene, meta-methylstyrene, para-methylstyrene, methyl vinyl ketone, perfluoropropylene, tetrafluoroethylene, vinyl benzoate, vinyl bromide, vinyl butyrate, vinyl chloride, vinyl fluoride, N-vinylcarbazole, N-vinylpyrrolidone, vinylidene chloride and vinylidene fluoride.

The term acrylic monomer as used herein, as illustrated in the examples, refers to esters of acrylic acid or methacrylic acid. These esters are formed by reacting one of the acids mentioned above with an alcohol or a substituted alcohol containing one to eighteen carbon atoms. Suitable alcohols include methyl alcohol, butyl alcohol, hexyl alcohol, 2-ethylhexyl alcohol, decyl-octyl alcohol, lauryl alcohol, stearyl alcohol, dimethylaminoethyl alcohol, t-butylaminoethyl alcohol, glycidyl alcohol, 2-methoxyethyl alcohol, hydroxyethyl alcohol, and hydroxypropyl alcohol.

The polymerization of unsaturated compounds in the process of the present invention can be brought about under both homogeneous and heterogeneous conditions.

When the photopolymerization is carried out in an air atmosphere, the useful concentration range of ortho-bromoacetophenone is 0.05 to 1.0 percent by volume with the preferred concentration being 0.5 percent by volume.

Since oxygen interferes with the photopolymerization of many ethylenically unsaturated organic monomers, it is frequently preferable or necessary to carry out the polymerization in an oxygen-free atmosphere such as nitrogen, carbon dioxide, helium, argon, and so forth. When the photopolymerization is carried out in an oxygen-free atmosphere, the rate of reaction is faster, the polymer that is formed has a higher molecular weight, and the yield of the polymer is much higher. If the reaction is carried out in an oxygen-free atmosphere, such as nitrogen, as is indicated in Examples 1 and 2, the required initiator concentration range is lower, between 0.02 to 0.5 percent by volume with the preferred concentration being about 0.2 percent by volume. In general, the use of an oxygen-free atmosphere reduces the proportions of ortho-bromoacetophenone needed.

While it is well known in the art that organic compounds containing bromine have a tendency for the bromine to split away from the compound and act as a photopolymerization initiator, the level of effectiveness in such cases is usually quite low. However, in accordance with the practice of this invention the ortho-bromoacetophenone has a high level of effectiveness which is unexpected. For example, under identical conditions and concentrations the yield in the polymerization of methyl methacrylate using ortho-bromoacetophenone was 325% greater than that with meta-bromoacetophenone and it was 77% greater than when para-bromoacetophenone was used. It has been determined that the yield using ortho-bromoacetophenone is 795% greater than that obtained with acetophenone, which differs from ortho-bromoacetophenone by the absence of the bromine atom in the ortho position. The high degree of increased effectiveness of ortho-bromoacetophenone as a photo-initiator in contrast to related or similar compounds is unexpected and we cannot explain the reason for this difference.

While the embodiments of the present invention herein disclosed constitute preferred forms, it is to be understood that other forms might be adopted.

I claim:

1. A process for the production of polymeric material which comprises irradiating an acrylic monomer with ultraviolet light in the presence of a small but effective amount of ortho-bromoacetophenone whereby said ortho-bromoacetophenone acts as a photo initiator.

2. A process according to claim 1 conducted in an air atmosphere wherein said initiator is employed in an amount within the range from 0.05 to 1.0% by volume of the acrylic monomer.

3. A process according to claim 1 conducted in an oxygen-free atmosphere wherein said initiator is employed in amounts within the range of from 0.02 to 0.5% by volume of the acrylic monomer.

4. A process for the production of polymeric material which comprises irradiating styrene with ultraviolet light in the presence of a small but effective amount of ortho-bromoacetophenone whereby said ortho-bromoacetophenone acts as a photo initiator.

5. A process for the production of polymeric material which comprises irradiating a polymerizable ethylenically unsaturated organic monomer taken from the group consisting of an acrylic monomer, styrene, methylstyrene, vinyl acetate, methyl vinyl ketone, and vinyl butyrate with ultraviolet light in the presence of a small but effective amount of ortho-bromoacetophenone whereby said ortho-bromoacetophenone acts as a photo initiator.

References Cited

Tikhomolava et al.: Photosensitized Polymerization of Methyl Methacrylate, Zhur. Priklad. Khim. 32, pp. 1874–6 (1959).

MURRAY TILLMAN, *Primary Examiner.*

GEORGE F. LESMES, SAMUEL H. BLECH, *Examiners.*

R. B. TURER, *Assistant Examiner.*